United States Patent
Hawes et al.

[11] Patent Number: 5,838,233
[45] Date of Patent: Nov. 17, 1998

[54] OBJECT ORIENTATION SENSOR DEVICE

[75] Inventors: Kevin Joseph Hawes, Greentown; Frank Bruce Wiloch, Russiaville; Jon Paul Kelley, Kokomo, all of Ind.

[73] Assignee: Delco Electronics Corporation, Kokomo, Ind.

[21] Appl. No.: 699,006

[22] Filed: Aug. 16, 1996

[51] Int. Cl.$^6$ .................................................. G08B 13/14
[52] U.S. Cl. .................... 340/572; 340/573; 340/686; 340/436; 297/216.11; 280/735; 455/83
[58] Field of Search .................... 340/551, 552, 340/572, 686, 436, 573, 825.54; 297/216.11; 250.1; 280/730.1, 735; 455/78, 82, 83; 342/51

[56] References Cited

U.S. PATENT DOCUMENTS

| 4,380,822 | 4/1983 | Broton | 455/83 |
|---|---|---|---|
| 5,105,190 | 4/1992 | Kip et al. | 340/572 |
| 5,474,327 | 12/1995 | Schousek | 280/730.1 |
| 5,515,933 | 5/1996 | Meyer et al. | 280/735 |
| 5,565,846 | 10/1996 | Geiszlet et al. | 340/572 |
| 5,570,903 | 11/1996 | Meister et al. | 280/735 |
| 5,618,056 | 4/1997 | Schoos et al. | 340/572 |

FOREIGN PATENT DOCUMENTS

| 0 650 869 A | 1/1994 | European Pat. Off. | B60R 21/00 |
|---|---|---|---|
| 2 287 859 | 6/1995 | United Kingdom | B60R 21/00 |

OTHER PUBLICATIONS

Demmpler A: "Child Seat Detector"—Automotive Engineering, vol. 104, No. 4, 1 Apr. 1996, p. 48 XP000583605.

*Primary Examiner*—Jeffery Hofsass
*Assistant Examiner*—Daniel J. Wu
*Attorney, Agent, or Firm*—Mark A. Navarre

[57] ABSTRACT

In a preferred embodiment, an object orientation sensor device, including: a first LC tag disposed at a first selected location in the object; a driver/reader circuit disposed so as to detect the presence of the first LC tag when the object is in a first orientation and to not detect the presence of the first LC tag when the object is not in the first orientation; and the driver/reader circuit being arranged to energize the first LC tag with a magnetic field and to subsequently detect a first resonant frequency echo produced by the first LC tag when the magnetic field is removed.

7 Claims, 4 Drawing Sheets

OBJECT ORIENTATION SENSOR DEVICE

BACKGROUND OF THE INVENTION

1. Field of the Invention

The present invention relates to detecting the position of an object generally and, more particularly, but not by way of limitation, to novel, low-cost, object orientation sensor device.

2. Background Art

While the present invention is described with reference to detecting the orientation of an infant seat placed on a vehicle passenger seat, it will be understood that it is applicable, as well, to any situation in which it is desired to detect the orientation of an object.

It is generally thought that rearwardly facing infant seats are safer than those that face forewardly. However, it is important that, when a rearwardly facing infant seat is placed on a vehicle passenger seat, the airbag on the passenger side of the vehicle be disabled, in order to protect an infant in the seat from injury due to airbag deployment.

It is known to place a passive RF identification tag inside the infant seat at the front edge thereof, which tag is interrogated by a transmitter/receiver located in the rear edge of the passenger seat of the vehicle. The RF tag has a unique signature which indicates when the tag is in proximity to the transmitter/receiver, which indicates, therefore, that the infant seat is facing rearwardly. When the infant seat is detected as facing rearwardly, an output signal from the transmitter/receiver is employed to disable the passenger side airbag. If the infant seat is facing forewardly, the transmitter/receiver receives no signal from the RF tag and the passenger side airbag is left armed.

A disadvantage of the use of such RF identification tags is that they are relatively expensive.

Accordingly, it is a principal object of the present invention to provide object orientation sensor device and method that are economical.

It is a further object of the invention to provide such an object orientation sensor device that is rugged.

It is an additional object of the invention to provide such an object orientation sensor device and method that are simple and easily implemented.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an object orientation sensor device, comprising: a first LC tag disposed at a first selected location in said object; a driver/reader circuit disposed so as to detect the presence of said first LC tag when said object is in a first orientation and to not detect the presence of said first LC tag when said object is not in said first orientation; and said driver/reader circuit being arranged to energize said first LC tag with a magnetic field and to subsequently detect a first resonant frequency echo produced by said first LC tag when said magnetic field is removed.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
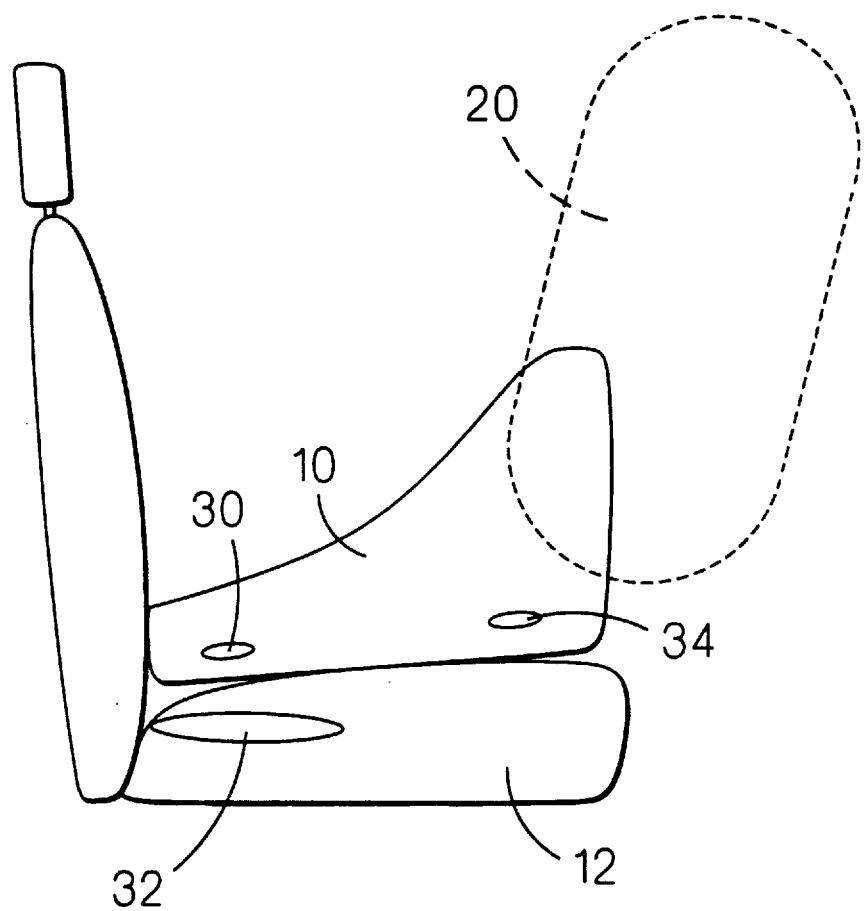
FIG. 1 is a side elevational view of a rearwardly facing infant seat placed on a passenger seat of a vehicle, incorporating elements of the sensor of the present invention.

Reference should now be made to the drawing figures, on which similar or identical elements are given consistent identifying numerals throughout the various figures, and on which parenthetical references to figure numbers direct the reader to the view(s) on which the element(s) being described is (are) best seen, although the element(s) may be seen also on other views.

FIG. 1 illustrates a rearwardly facing infant seat 10 disposed on a passenger seat 12 of a vehicle (not shown). FIG. 1 also illustrates a deployed passenger side airbag 20 and indicates that the airbag would impact against infant seat 10 as the airbag is deployed, possibly causing injury to an infant (not shown) seated in the infant seat.

A first transponder in the form of a first LC tag 30 is disposed in infant seat 10 near the front edge thereof and in proximity to a driver/reader circuit 32 disposed in passenger seat 12 near the rear edge thereof. If desired for redundancy, a second transponder in the form of a second LC tag 34 may be disposed in infant seat 10 near the rear edge thereof. It will be understood that second LC tag 34 will be in proximity to driver/reader circuit 32 when infant seat 10 is in a forewardly facing orientation. First and second LC tags 30 and 34 may be disposed near edges of the infant seat or in other suitable locations, with driver/reader circuit 32 disposed accordingly.

Figure 2A:
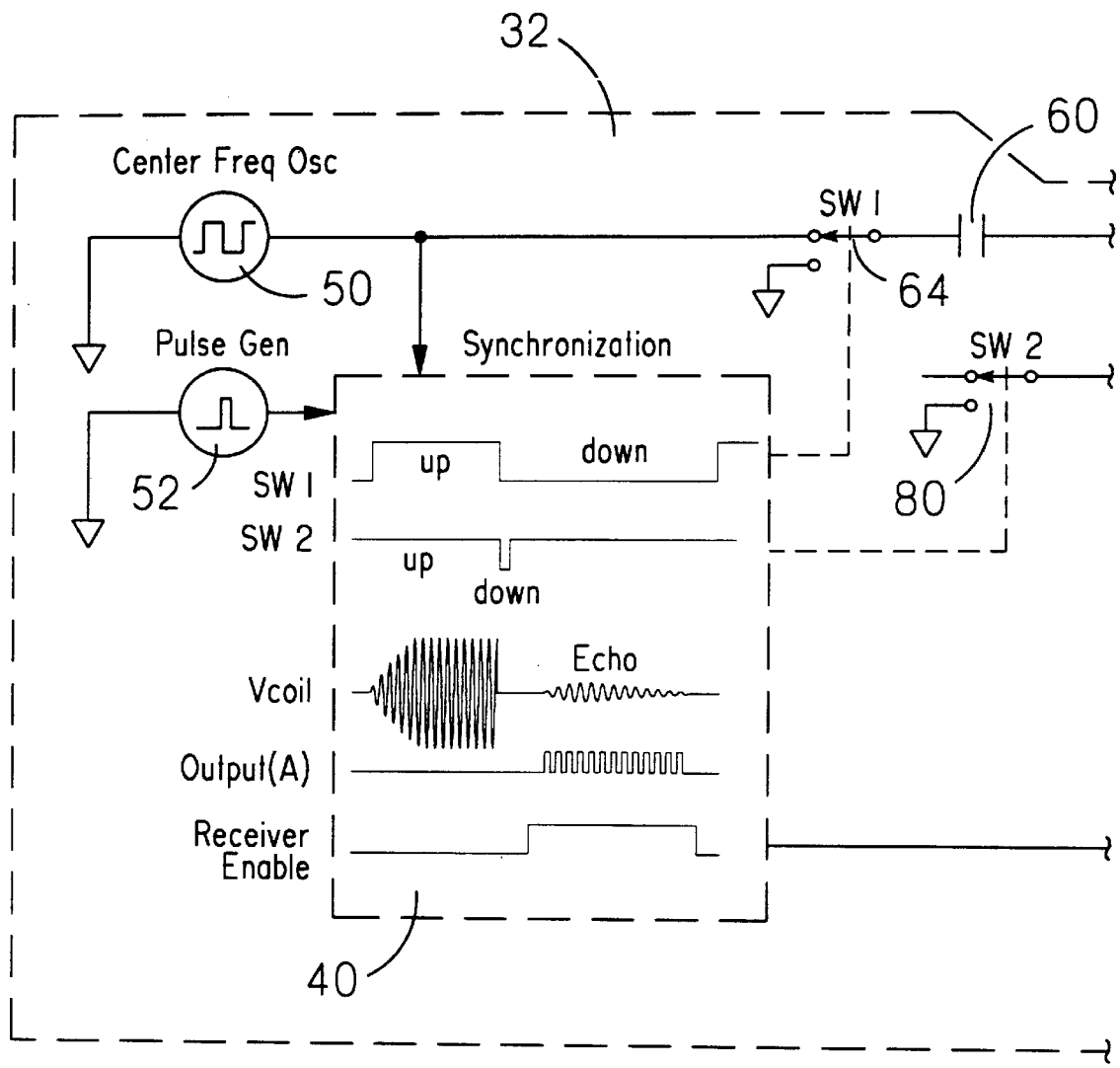
FIGS. 2a and 2b together comprise a block/schematic diagram of the sensor.
Figure 2B:
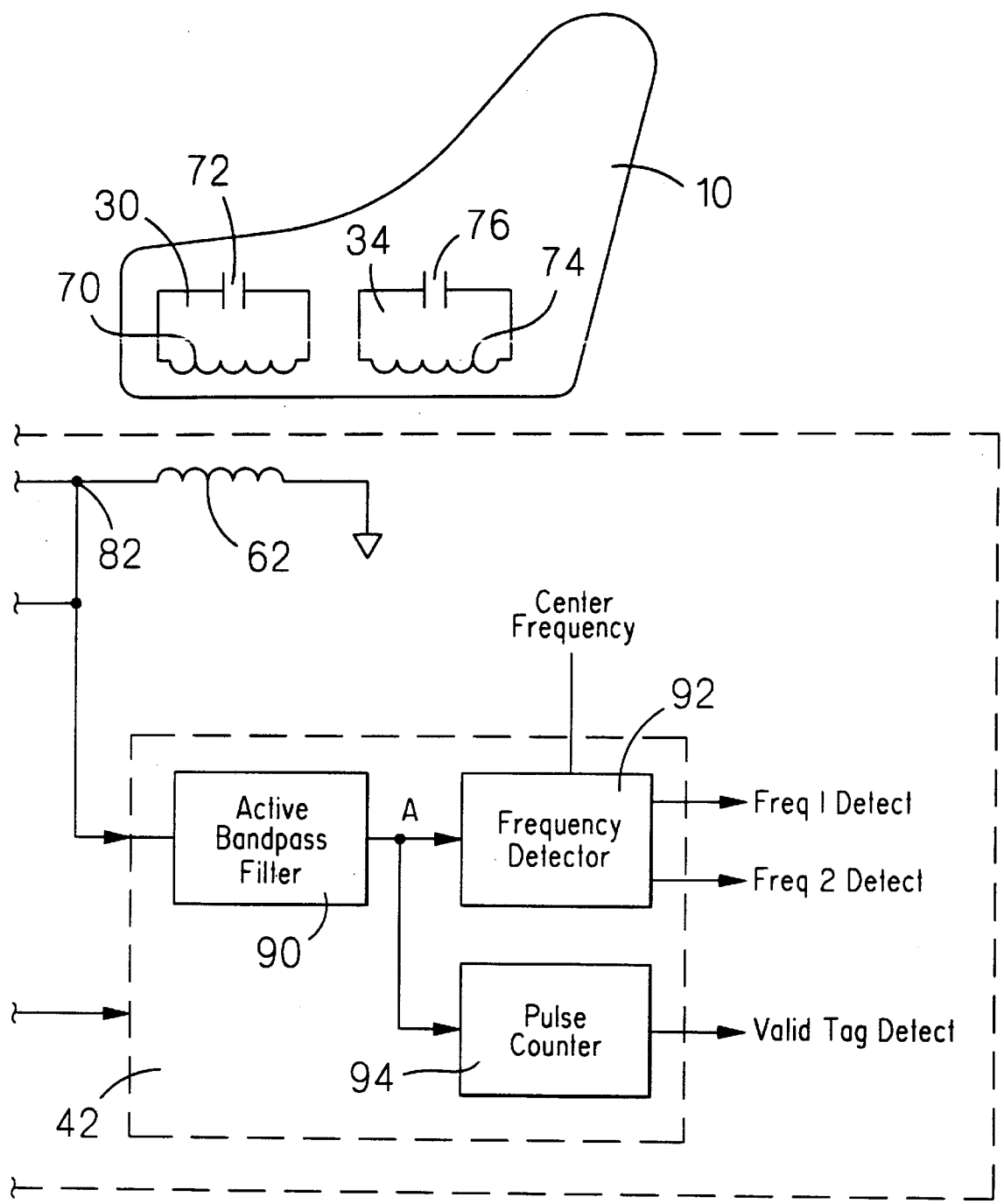

FIG. 2 illustrates the details of driver/reader circuit 32. Circuit 32 includes synchronization circuitry 40 and detection circuitry 42. A center frequency oscillator 50 and a pulse generator 52 provide inputs to synchronization circuitry. Oscillator 50 generates an alternating electrical current, and is also connected in series to a capacitor 60 and a inductor 62 through a first electronic switch 64. It can be seen that inductor 62 is in proximity to an inductor 70 which forms part of LC tag 30 in infant seat 10 when the infant seat is in a rearwardly facing orientation (FIG. 1). The remainder of LC tag 30 is a capacitor 72 connected in parallel with inductor 70. Likewise, LC tag 34 comprises an inductor 74 and a capacitor 76 connected in parallel. The components of LC tags 30 and 34 are chosen so that the LC tags have different resonant frequencies above and below the frequency produced by center frequency oscillator 50.

A second electronic switch 80 is connected to a node 82 between capacitor 60 and inductor 62 and to ground, with the node also connected to provide an input signal to detection circuitry 42. Detection circuitry is configured to receive the input signal through an active bandpass filter 90 tuned in a range around the frequency of center frequency oscillator 50, with the filter providing inputs to a frequency detection circuit 92, which also receives the center frequency as an input, and to a pulse counter 94.

In operation, synchronization circuitry 40 receives a pulse from pulse generator 52. This causes first switch 64 to be moved to its UP position, thus connecting center frequency oscillator 50 to capacitor 60 which energizes the series combination of capacitor 60 and inductor 62 at the center frequency to generate a magnetic field around the inductor. LC tag 30, being within the magnetic field, oscillates at this same frequency while gaining energy. Then, first switch 64 is moved to its DOWN position, disconnecting center frequency oscillator 50 from capacitor 60 and, simultaneously, second switch 80 is moved to its DOWN position shunting to ground the energy in the series tank circuit comprising the inductor 62 and capacitor 60. As a result, inductor 62 is connected in parallel with its tuning capacitor 60 to form a very sensitive resonant tuned receiver. The residual energy from what is now a parallel tank LC is discharged to ground within one cycle by shorting the circuit when the voltage is at its peak and therefore the current is zero. In this case, all residual energy is contained within capacitor 60, and inductor 62 contains zero residual energy. This is indicated by the general equations for energy storage in a capacitor and inductor:

$$E_{cap} = (½)Cv^2 \quad E_{Ind} = (½)LI^2$$

Shorting out the parallel LC at maximum current (parallel voltage is zero) would take considerably longer, since inductor 62 will try to maintain the same current and is discharging into a shorted load.

LC tag 30 then begins oscillating at its resonant frequency and simultaneously radiates its stored energy back to inductor 62 at its resonant frequency. This frequency shifted echo now builds up in amplitude in the similarly tuned inductor 62 and capacitor 60. This signal is amplified by bandpass filter 90 and fed into frequency detection circuit 92 and pulse counter circuit 94. Frequency detection circuit 92 identifies whether the echo is from LC tag 30 or LC tag 34 and provides inputs to the airbag controller (not shown) and may also provide inputs to alarm or warning systems. These signals are used by the airbag controller to disable passenger airbag 20 (FIG. 1) if the presence of a rearwardly facing infant seat is detected. Pulse counter circuit 94 measures field strength to eliminate noise and is provided to ascertain that the apparent echo signal is valid, since, in the environment under consideration, there may be a number of other signals which might mimic echoes from LC tags 30 or 34. Subsequent pulses from pulse generator 52 re-initiate the above sequence.

Reference to the waveforms shown in synchronization circuitry 40 show the relative timing of the events described above.

Advantages of this detection system include: it uses a very inexpensive transponder (LC); it offers detection of a transponder and discrimination between different transponders; and it obtains an echo signal while the driver oscillator is disabled, thus substantially reducing oscillator power supply filtering requirements.

As is indicated above, LC tag 34 is somewhat redundant. The system is capable of operating with a single LC tag 30, which may, in that case, have a resonant frequency identical to that of the frequency of oscillator 50. However, second LC tag 34 may be provided, as shown, to give positive indication that infant seat 10 is in a forewardly facing orientation.

A preferred frequency for center frequency oscillator 50 is 125 KHz. When this center frequency is chosen, the components of LC tag 30 may be selected so as to provide a resonant frequency of about 110 KHz and the components of LC tag 34 may be selected so as to provide a resonant frequency of about 140 KHz. Charging time of inductor 62 is about 125 microseconds, there is an interval of about 50 microseconds before the echo begins, and the duration of the echo signal is about 75 microseconds.

Figure 3:
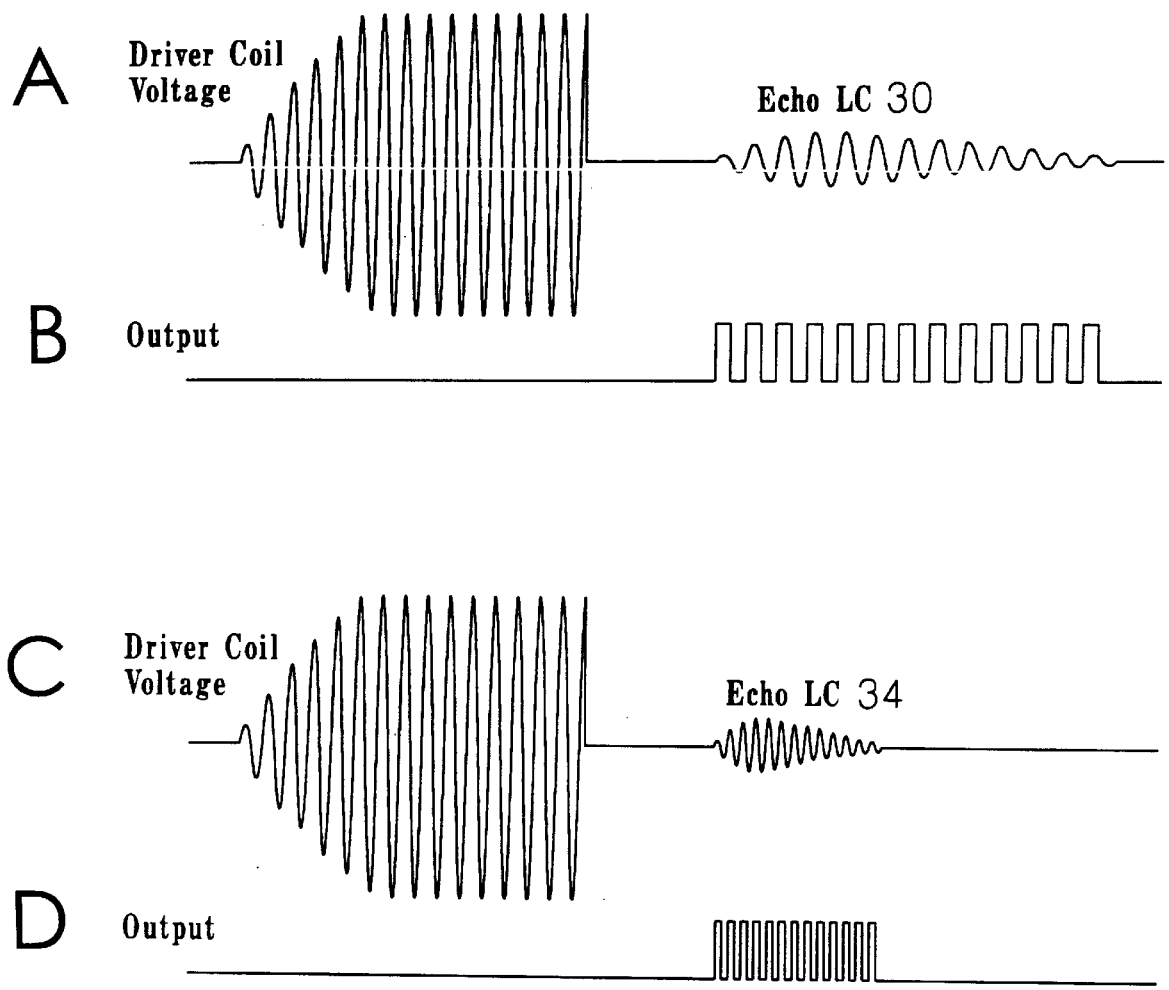
FIG. 3, Graphs A–D, comprises waveforms illustrating the charging of, and signals received from, two LC tags used in the sensor.

FIG. 3 shows waveforms for the energizing LC tag 30 (Graphs A and B) and LC tag 34 (Graphs C and D) at the center frequency and resonant frequency echoes for each of the LC tags, produced on either side of the center frequency, together with the output of pulse counter circuitry 94 for each of the LC tags.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An object orientation sensor device, comprising:
   (a) a first LC tag disposed at a first selected location in said object;
   (b) a driver/reader circuit disposed so as to detect the presence of said first LC tag when said object is in a first orientation and to not detect the presence of said first LC tag when said object is not in said first orientation; and
   (c) said driver/reader circuit including a tank circuit including an inductor and capacitor joined at a first node and having a second node, an oscillator, a receiver circuit coupled to said tank circuit at said first node, and a synchronization circuit for (1) connecting said oscillator to said second node for energizing said tank circuit with alternating electrical current to produce a magnetic field for energizing said first LC tag, (2) disconnecting said oscillator from said second node, (3) momentarily shorting said inductor to discharge said tank circuit, and (4) enabling said receiver circuit to detect a first resonant frequency echo produced by said first LC tag when said oscillator is disconnected from said second node and said tank circuit is discharged.

2. An object orientation sensor device, as defined in claim 1, further comprising:
   (a) a second LC tag disposed at a second selected location in said object;
   (b) said driver/reader circuit being disposed so as to detect the presence of said second LC tag when said object is in a second orientation and to not detect the presence of said second LC tag when said object is not in said second orientation; and
   (c) said driver/reader circuit being effective to energize said second LC tag with said magnetic produced by energizing said tank circuit, and to subsequently detect a second resonant frequency echo produced by said second LC tag when said oscillator is disconnected from said second node and said tank circuit is discharged.

3. An object orientation sensor device, as defined in claim 2, wherein: said alternating electrical current of said oscillator has a frequency intermediate that of said first and second resonant frequencies.

4. An object orientation sensor device, as defined in claim 1, wherein:
   (a) said tank circuit includes a third node connected to ground so that said inductor and capacitor form a series tank circuit when said oscillator circuit is connected to said second node;
   (b) said synchronization circuit connects said second node to ground upon disconnection of said oscillator from said second node so that said inductor and capacitor form a parallel tank circuit; and
   (c) said first resonant frequency echo is detected by said parallel tank circuit after said said second node is connected to ground and said tank circuit is discharged.

5. An object orientation sensor device, as defined in claim 1, wherein:
   (a) said first LC tag is disposed in an infant seat for placement on a passenger seat in a vehicle;
   (b) said driver/reader circuit is disposed in said passenger seat so as to detect the presence of said first LC tag when said infant seat is rearwardly facing; and
   (c) said driver/reader circuit is to output a signal for use in disabling a passenger airbag when said infant seat is detected as being rearwardly facing.

6. An object orientation sensor device, as defined in claim 1, wherein:
   one end of said inductor is connected to ground so that said inductor and capacitor form a series tank circuit when said oscillator circuit is connected to said second node; and
   said synchronization circuit momentarily connects said first node to ground upon disconnection of said oscillator from said second node, thereby to momentarily short said inductor to discharge said tank circuit.

7. An object orientation sensor device, as defined in claim 6, wherein said synchronization circuit momentarily connects said first node to ground when the current in said inductor is substantially zero, thereby to discharge said tank circuit in substantially one cycle of its energization.

* * * * *